US009385540B2

(12) United States Patent
Kudo et al.

(10) Patent No.: US 9,385,540 B2
(45) Date of Patent: Jul. 5, 2016

(54) BATTERY CONTROL SYSTEM, BATTERY CONTROL DEVICE, BATTERY CONTROL METHOD AND RECORDING MEDIUM

(75) Inventors: Koji Kudo, Tokyo (JP); Hisato Sakuma, Tokyo (JP); Hitoshi Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 205 days.

(21) Appl. No.: 14/346,316

(22) PCT Filed: Aug. 8, 2012

(86) PCT No.: PCT/JP2012/070136
§ 371 (c)(1),
(2), (4) Date: Mar. 20, 2014

(87) PCT Pub. No.: WO2013/042475
PCT Pub. Date: Mar. 28, 2013

(65) Prior Publication Data
US 2014/0239913 A1 Aug. 28, 2014

(30) Foreign Application Priority Data

Sep. 22, 2011 (JP) ................................. 2011-207341

(51) Int. Cl.
*H02J 7/00* (2006.01)
*H02J 3/32* (2006.01)
(Continued)

(52) U.S. Cl.
CPC ... *H02J 7/00* (2013.01); *H02J 3/32* (2013.01); *H02J 3/24* (2013.01); *H02J 3/383* (2013.01);
(Continued)

(58) Field of Classification Search
CPC ........................................................ H02J 7/00

USPC ............................................................ 320/134
See application file for complete search history.

(56) References Cited

U.S. PATENT DOCUMENTS

2010/0007333 A1 1/2010 Sekiguchi et al.
2014/0217989 A1* 8/2014 Kudo ........................ H02J 3/32
320/134

FOREIGN PATENT DOCUMENTS

EP 2472695 7/2012
JP 2009-065766 3/2009
(Continued)

OTHER PUBLICATIONS

Ota, Yutaka et al., Proposal of Smart Storage for Ubiquitous Power Grid, The Transactions of the Institute of Electrical Engineers of Japan. B, vol. 130, No. 11, pp. 989-994, 2010.
(Continued)

*Primary Examiner* — Sun Lin
(74) *Attorney, Agent, or Firm* — Wilmer Cutler Pickering Hale and Dorr LLP

(57) ABSTRACT

A battery control system, which controls operation of a plurality of batteries connected to an electric power system, comprises: detecting means that detects a delay period of each of the batteries which represents a period that has elapsed after the battery control system supplies the battery with an execution command for charging or discharging the battery until the battery operates according to the execution command; measuring means that measures a frequency rate-of-change of electric power of the electric power system; selecting means that selects adjustment batteries for adjusting the electric power of the electric power system from the batteries based on the frequency rate-of-change and the delay period of each of the batteries; and command means for supplying the execution command to the adjustment batteries.

13 Claims, 10 Drawing Sheets

(51) Int. Cl.
*H02J 3/46* (2006.01)
*H02J 3/24* (2006.01)
*H02J 3/38* (2006.01)

(52) U.S. Cl.
CPC .. *H02J 3/386* (2013.01); *H02J 3/46* (2013.01); *Y02E 10/563* (2013.01); *Y02E 10/566* (2013.01); *Y02E 10/763* (2013.01); *Y02E 70/30* (2013.01)

(56) References Cited

FOREIGN PATENT DOCUMENTS

| | | |
|---|---|---|
| JP | 2009-213240 | 9/2009 |
| JP | 2010-233353 | 10/2010 |
| JP | 2011-019380 | 1/2011 |
| JP | 2011-050133 | 3/2011 |
| WO | WO-2011/024769 | 3/2011 |

OTHER PUBLICATIONS

NEDO's Yokohama Smart City Project (YSCP), Aug. 2010; 59 pp.
Ota, Yutaka et al., Effect of Smart Storage in Ubiquitous Power Grid on Frequency Control, Effect of Smart Storage in Ubiquitous Power Grid on Frequency Control, The transactions of the Institute of Electrical Engineers of Japan. B, vol. 131, No. 1, pp. 94-100, 2011.
International Search Report corresponding to PCT/JP2012/070136, dated Nov. 13, 2012; 2 pp.

* cited by examiner

BATTERY CONTROL SYSTEM, BATTERY CONTROL DEVICE, BATTERY CONTROL METHOD AND RECORDING MEDIUM

CROSS REFERENCE TO RELATED APPLICATIONS

This application is a national stage application of International Application No. PCT/JP2012/070136 entitled "Battery Control System, Battery Control Device, Battery Control Method and Recording Medium", filed on Aug. 8, 2012, which claims the benefit of the priority of Japanese Patent Application No. 2011-207341, filed on Sep. 22, 2011, the disclosures of each of which are hereby incorporated by reference in their entirety.

TECHNICAL FIELD

The present invention relates to a battery control system, a battery control apparatus, a battery control method, and a recording medium, and more particularly to a battery control system, a battery control apparatus, a battery control method, and a recording medium for controlling the discharging or charging of a plurality of batteries that are connected to an electric power system.

BACKGROUND ART

When an electric power station breaks down due to an unexpected accident or when a number of wind farms or photovoltaic power plants that have been interconnected are separated off, the associated electric power system is thrown into a state of emergency because its electric power supplying capability abruptly drops.

There has been proposed a technology for coping with such an emergency by discharging energy storage devices (e.g., stationary storage batteries or secondary batteries on electric vehicles) that are installed at various customer locations to manage the balance of electric power supply and demand during a period of time ranging from several to several tens of minutes until the output of the existing electric power station is changed and until another electric power station becomes operational (see Non-patent documents 1, 2, and 3). The energy storage devices that are installed at various customer locations will hereinafter be referred to as "ES" (Energy Storage).

According to the technology which manages the balance of electric power supply and demand by discharging the ESs installed at various customer locations, a number of ESs that are in widespread usage among customers can be used to manage the balance of electric power supply and demand. The widespread usage of ESs makes it possible to increase the capacities of batteries (batteries provided by ESs) that are used to manage the balance of electric power supply and demand.

If a technology wherein "each ES monitors the frequency of electric power at a point of junction to the electric power system and autonomously discharges itself in proportion to a frequency shift to keep the frequency of electric power within a desired range" is employed, then it becomes possible to make the battery respond quickly in case of emergency.

FIG. 1 is a diagram illustrating the technology wherein "each ES monitors the frequency of electric power at the point of junction at the electric power system and autonomously discharges itself in proportion to a frequency shift to keep the frequency of electric power within a desired range. The point of junction at the electric power system may, for example, be the outermost portion of a wire through which electric power is applied from the electric power system through an electric power meter to a power switchboard on the customer's premises. However, on the assumption that the frequency remains the same on the customer's premises, the point of junction at the electric power system may be a point of junction where the ES is wired.

In FIG. 1, controller 102 that controls ES 101 monitors the frequency of electric power at system junction point 103. Controller 102 controls a discharged level of ES 101 depending on a value produced when the monitored result (measured frequency) is subtracted from the nominal frequency (e.g., 50 Hz) of electric power.

In FIG. 1, a unit that is indicated as ES 101 includes a storage battery pack, a storage battery control unit, and a power conditioner for converting a DC output from a storage battery into an alternating current, which are omitted from illustration for the sake of brevity.

PRIOR TECHNICAL DOCUMENTS

Non-Patent Documents

Non-patent document 1: Proposal of Smart Storage for Ubiquitous Power Grid, by Yutaka Ota et al., The transactions of the Institute of Electrical Engineers of Japan. B, Vol. 130, No. 11, pp. 989-994, 2010

Non-patent document 2: Effect of Smart Storage in Ubiquitous Power Grid on Frequency Control, by Yutaka Ota et al., The transactions of the Institute of Electrical Engineers of Japan. B, Vol. 131, No. 1, pp. 94-100, 2011

Non-patent document 3: Materials introducing details of an experiment in Yokohama (YSCP) in a regional experimentation project by NEDO

SUMMARY OF THE INVENTION

Problems to be Solved by the Invention

According to the technique shown in FIG. 1, each customer's ES that is not under the control of an electric power company, i.e., the administrator of an electric power system, autonomously discharges itself. Therefore, the administrator of the electric power system finds it difficult to grasp in advance whether or not the customer's ES is able to achieve an appropriate discharged level quickly, and hence finds it difficult to control the balance of electric power supply and demand appropriately.

It is an object of the present invention to provide a battery control system, a battery control apparatus, a battery control method, and a recording medium which are capable of solving the above problems.

Means for Solving the Problems

According to the present invention, there is provided a battery control system for controlling operation of a plurality of batteries connected to an electric power system, comprising detecting means that detects a delay period of each of the batteries which represents a period that has elapsed after the battery control system supplies the battery with an execution command for charging or discharging the battery until the battery operates according to the execution command, measuring means that measures a frequency rate-of-change of electric power of the electric power system, selecting means that selects adjustment batteries for adjusting the electric power of the electric power system from the batteries based on the frequency rate-of-change and the delay period of each of the batteries, and command means for supplying the execution command to the adjustment batteries.

According to the present invention, there is provided a battery control apparatus for controlling operation of batteries connected to an electric power system, comprising control means that, in response to inspection information for detecting a communication delay period of a communication path used by the batteries, sends predetermined information of a source of the inspection information, and, in response to an operation command indicating charging or discharging operation of the batteries, controls the batteries based on the operation command.

According to the present invention, there is provided a battery control method to be performed by a battery control system for controlling operation of a plurality of batteries connected to an electric power system, comprising detecting a delay period of each of the batteries which represents a period that has elapsed after the battery control system supplies the battery with an execution command for charging or discharging the battery until the battery operates according to the execution command, measuring a frequency rate-of-change of electric power of the electric power system, selecting adjustment batteries for adjusting the electric power of the electric power system from the batteries based on the frequency rate-of-change and the delay period of each of the batteries, and supplying the execution command to the adjustment batteries.

According to the present invention, there is provided a battery control method to be performed by a battery control apparatus for controlling operation of batteries connected to an electric power system, comprising, in response to inspection information for detecting a communication delay period of a communication path used by the batteries, sending predetermined information of a source of the inspection information, and, in response to an operation command indicating an operation to charge or discharge the batteries, controlling the batteries based on the operation command.

According to the present invention, there is provided a recording medium readable by a computer and that stores a program which enables the computer to perform a detecting procedure for detecting a delay period of each of the batteries which represents a period that has elapsed after the battery control system supplies the battery with an execution command for charging or discharging the battery until the battery operates according to the execution command, a measuring procedure for measuring a frequency rate-of-change of electric power of the electric power system, a selecting procedure for selecting adjustment batteries for adjusting the electric power of the electric power system from the batteries based on the frequency rate-of-change and the delay period of each of the batteries, and a command procedure for supplying the execution command to the adjustment batteries.

According to the present invention, there is provided a recording medium readable by a computer and that stores a program which enables the computer to perform a procedure that, in response to inspection information for detecting a communication delay period of a communication path used by the batteries, sends predetermined information of a source of the inspection information, and, in response to an operation command indicating an operation to charge or discharge the batteries, controls the batteries based on the operation command.

Advantages of the Invention

According to the present invention, it is possible to control the balance of electric power supply and demand appropriately by using ESs.

BRIEF DESCRIPTION OF THE DRAWINGS

FIG. 4 is a diagram showing a mapping table of the results of a grouping process carried out by mapping table generator 2b3a.

MODE FOR CARRYING OUT THE INVENTION

Exemplary embodiments of the present invention will be described below with reference to the drawings.

Figure 1:
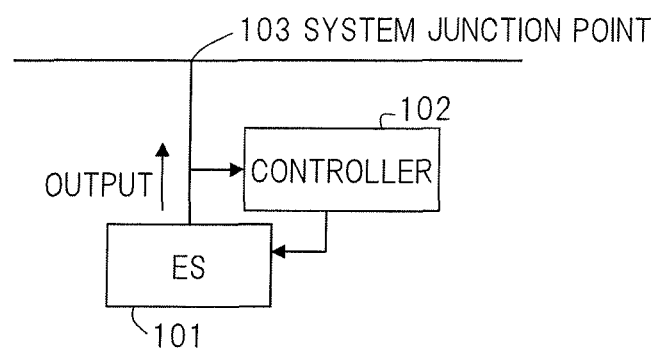
FIG. 1 is a diagram illustrating the background art.
Figure 2:
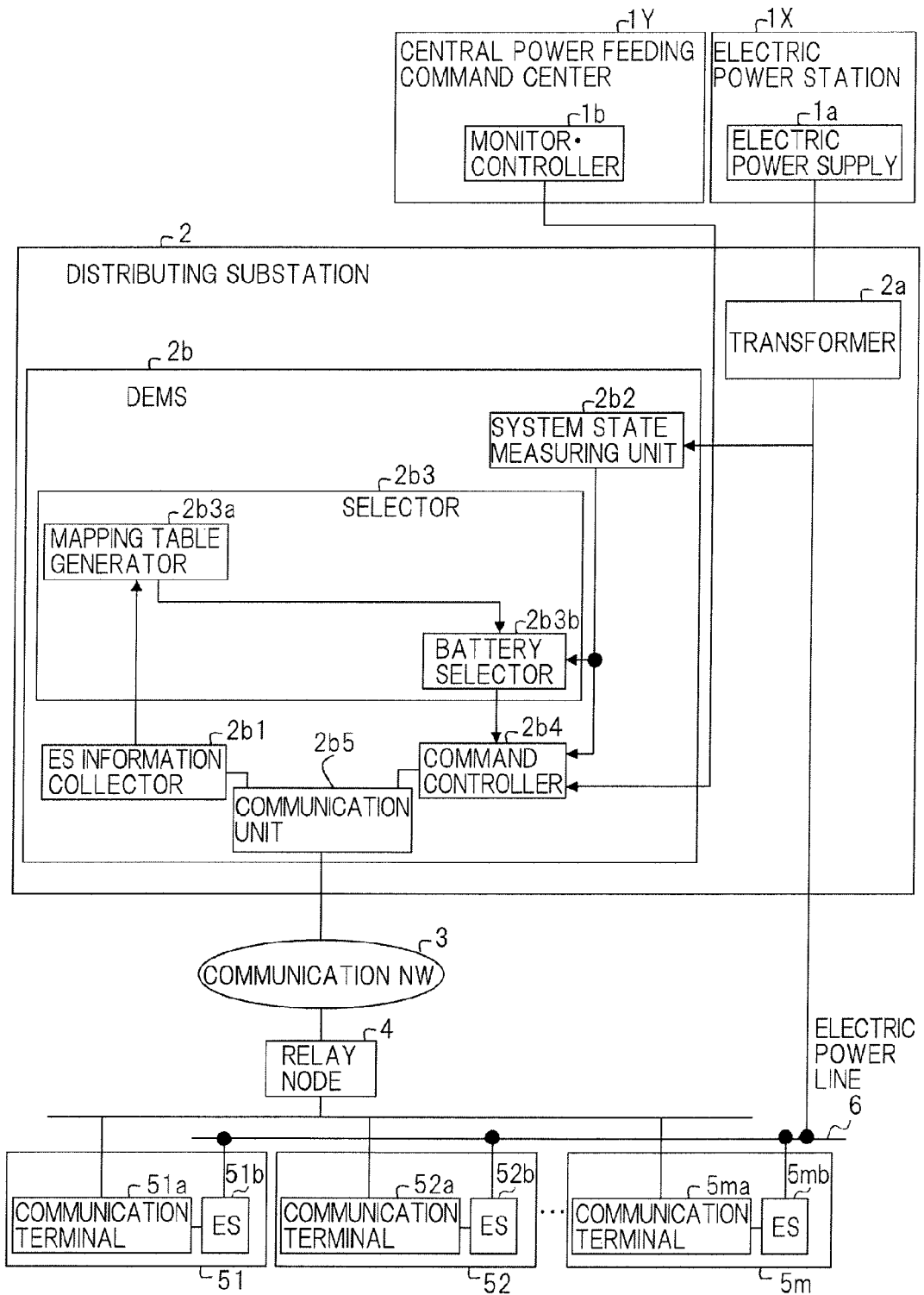
FIG. 2 is a diagram showing an electric power control system incorporating a battery control system according to an exemplary embodiment of the present invention.

FIG. 2 is a diagram showing an electric power control system incorporating a battery control system according to an exemplary embodiment of the present invention.

As shown in FIG. 2, the electric power control system includes electric power supply 1a, monitor-controller 1b, transformer 2a, DEMS (Distributed Energy Management System) 2b, communication NW (NetWork) 3, relay node 4, communication terminals 5la through 5ma, and ESs 5lb through 5mb, where m represents an integer of 2 or greater.

Electric power supply 1a comprises an electric power generator such as a thermal electric power generator installed in electric power station 1X. Monitor-controller 1b is provided in central power feeding command center 1Y. Transformer 2a and DEMS 2b are provided in distributing substation 2. Communication terminals 5la through 5ma are connected respectively to ESs 5lb through 5mb. ESs 5lb through 5mb are included respectively in battery control apparatus 5l through 5m that are owned by customers who consume electric power. ESs 5lb through 5mb comprise, for example, stationary storage batteries or secondary batteries on electric vehicles. Between central power feeding command center 1Y and electric power station 1X, there is a communication line to send commands from central power feeding command center 1Y to electric power station 1X. In FIG. 2, such a communication line is omitted from illustration for the sake of brevity.

According to the present exemplary embodiment, DEMS 2b is illustrated as being present in distributing substation 2. However, DEMS 2b may not necessarily be present in distributing substation 2, but may desirably be installed in a place which has sufficient installation space, is capable of communicating with central power feeding command center 1Y and each ES to exchange information, and is subject to minimum communication delays.

Figure 3:
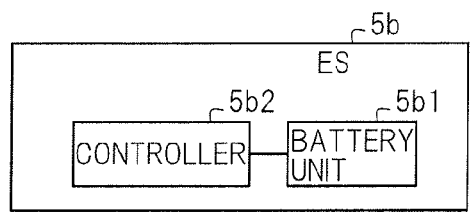
FIG. 3 is a block diagram of ES 5b used as each of ES 5lb through ES 5mb.

FIG. 3 is a block diagram of ES 5b used as each of ES 5lb through ES 5mb. As shown in FIG. 3, ES 5b includes battery unit 5b1 and controller 5b2 for controlling operation (charging operation and discharging operation) of battery unit 5b1. EB 5B includes a storage battery pack, a storage battery control unit (Battery Management Unit: BMU), and a power conditioner (PCS) for converting DC output from the storage battery pack into alternating current, which are omitted from illustration for the sake of gravity. Controller 5b2 may be ancillary to the BMU or the PCS, or may be installed outside of the ES depending on circumstances. Controller 5b2 may generally be referred to as control means.

Generally, with regard to the adjustment of electric power supply and demand for electric power systems (=electric power frequency control), regions and control techniques may be lined up in the order of shorter response periods (quicker responses) as follows:

(A) Inertial Force Region of Electric Power Generators (Synchronous Machines):

In an inertial force region of electric power generators (synchronous machines) where the response period is shortest, electric power demand fluctuations are compensated for in a manner by discharging and absorbing the inertial force of an electric power generator against the electric power demand fluctuations (inertial force=M×(df/dt) which is defined by inertial constant (M) and the acceleration (df/dt) of the rotor of the electric power generator). Under this control technique, the frequency of electric power continues to change linearly in order to compensate for an unbalanced relationship between electric power supply and demand.

(B) Governor Region:

In a governor region where the response period is second shortest, in order to reduce the frequency change in (A), the output of the electric power generator is controlled based on the frequency change of electric power according to governor-free operation, thereby performing a frequency control process (for frequency stabilization) and an electric power demand follow-up control process. As a result of this control technique, the frequency of electric power settles down to a certain value.

(C) LFC (Load Frequency Control) Region:

In an LFC region, a speed changer control process (electric power generation level control process) is performed on an electric power generator to achieve a target level represented by an area-demanded electric power generation level (Area Requirement), thereby performing a frequency control process (feedback control for a reference frequency) and an electric power demand follow-up control process.

In the event of an emergency wherein a certain electric power station stops generating electric power and wherein the ability of an electric power system to supply electric power abruptly drops, the electric power control system shown in FIG. 2 controls ESs, which are installed at various customer locations, to discharge ESs in order to manage the balance of electric power supply and demand during a period of time until a new electric power station becomes operational while making the output of the existing electric power station follow load fluctuations. As a result, during the period of time until the electric power system recovers its electric power generating capability, the value of a system frequency deviation Δf can be held to a minimum. In other words, the electric power control system can assist in the governor-free function (B) described above. Furthermore, if the storage battery capacity of ESs that can be controlled is large, the electric power control system can also perform the LFC function (C) described above for a certain period of time.

Electric power supply 1a supplies the electric power generated by electric power station 1X.

Monitor-controller 1b communicates with DEMS 2b.

Transformer 2a transforms the voltage of AC power from electric power supply 1a into a predetermined voltage, and supplies AC power having the predetermined voltage to electric power line 6. Between electric power supply 1a and transformer 2a, several transformers are connected for stepping down a high voltage of 500,000 V in Japan, for example, through multiple stages. Transformer 2a is a transformer for stepping down a voltage of 66 kV into a voltage of 6,600 V. The ESs are supplied with electric power after the electric power is stepped down from 6,600 V into 200 V by a pole transformer. For the sake of brevity, the upstream transformers and the pole transformer are omitted from illustration.

DEMS 2b may generally be referred to as a battery control system.

DEMS 2b includes ES information collector 2b1, system state measuring unit 2b2, selector 2b3, command controller 2b4, and communication unit 2b5. ES information collector 2b1 and command controller 2b4 are connected to communication NW 3 through communication unit 2b5.

ES information collector 2b1 may generally be referred to as detecting means.

ES information collector 2b1 detects, with respect to each of ESs 5lb through 5mb that are connected to electric power line 6, a period (hereinafter referred to as "delay period") Δt that has elapsed after DEMS 2b supplies the ES with an execution command for instructing the ES to charge or discharge itself (hereinafter simply referred to as "execution command") until the ES operates according to the execution command.

ES information collector 2b1 calculates, as the delay period Δt of an ES, the sum of a period (communication delay period), which is required until an execution command from DEMS 2b reaches the ES through communication NW 3, relay node 4, and the communication terminal, and a period (intradevice response period) which is required until the ES starts to operate according to the execution command after having received the execution command.

According to the present exemplary embodiment, each of ESs 5lb through 5mb stores response period information, which represents its own intradevice response period, in controller 5b2.

ES information collector 2b1 obtains in advance the response period information of each of ESs 5lb through 5mb from controller 5b2 of each of ESs 5lb through 5mb through the corresponding communication terminal from among communication terminals 5la through 5ma.

If controller 5b2 of each of ESs 5lb through 5mb has a function to measure an intradevice response period, i.e., a function to actually measure the time that has elapsed after controller 5b2 supplies battery unit 5b1 with a command for instructing the battery unit 5b1 to charge and discharge itself until battery unit 5b1 starts to operate according to the command, then ES information collector 2b1 may have controller 5b2 of each of ESs 5lb through 5mb measure the intradevice response period and obtain the measured intradevice response period.

ES information collector 2b1 detects the communication delay period with respect to each of ESs 5lb through 5mb, using ping (Packet INternet Groper) or the like, at predetermined intervals, e.g., 2-second intervals. The predetermined intervals are not limited to 2-second intervals, but may be changed.

For example, ES information collector 2b1 sends a response request (inspection information) for requesting a response to each of ESs 5lb through 5mb, receives a response (predetermined information) in reply to the response request, and detects, as a communication delay period, a period calculated by dividing, by 2, the period that has elapsed after ES information collector 2b1 sends the response request until it receives the response with respect to each of ESs 5lb through 5mb.

ES information collector 2b1 may alternatively store transmission time information representing the time at which it has sent the response request, and each of ESs 5lb through 5mb may send reception time information representing the time at which it has received the response request, together with a response in reply to the response request, to ES information collector 2b1. Then, ES information collector 2b1 may detect, as a communication delay period with respect to each of ESs 5lb through 5mb, the period between the time represented by the transmission time information, at which the response request has been sent to the ES, and the time represented by the reception time information, at which the response has been received from the ES.

Each time ES information collector 2b1 detects a communication delay period with respect to each of ESs 5lb through 5mb, it calculates a delay period Δt by adding the intradevice response period represented by the response period information obtained in advance and the detected communication delay period with respect to each of ESs 5lb through 5mb.

ES information collector 2b1 may use, as a delay period Δt, the sum of a period (hereinafter referred to as "processing delay period in DEMS 2b") Δdt required after DEMS 2b judges that an execution command needs to be supplied until it supplies an execution command, the intradevice response period, and the communication delay period. Since the processing delay period Δdt in DEMS 2b depends on the processing capability of DEMS 2b, the processing delay period Δdt is of a constant value specified depending on the processing capability of DEMS 2b. Consequently, the delay period Δt varies depending on the period which is the sum of the intradevice response period and the communication delay period.

When ES information collector 2b1 detects the communication delay period with respect to each of ESs 5lb through 5mb, it also detects values about prescribed items of each of ESs 5lb through 5mb. The prescribed items are different from the delay periods, and may represent, for example, a maximum charging and discharging output level Pmax with respect to an assumed charging and discharging period (hereinafter simply referred to as "maximum charging and discharging output level") and an SOC (State of Charge). The SCO includes the remaining capacity L of the battery.

According to the present exemplary embodiment, each of ESs 5lb through 5mb stores maximum charging and discharging output level information which represents its own maximum charging and discharging output level Pmax in controller 5b2.

ES information collector 2b1 obtains the maximum charging and discharging output level information of each of ESs 5lb through 5mb from controller 5b2 of each of ESs 5lb through 5mb.

System state measuring unit 2b2 may generally be referred to as measuring means.

System state measuring unit 2b2 detects the frequency rate-of-change df/dt of electric power in the electric power system and estimates an adjustment electric power level ΔP which needs to be adjusted in the electric power system based on the frequency rate-of-change df/dt.

For example, in order to measure frequency f for a period of 1 second in a unit of 0.01 Hz and convert the frequency f with a conversion accuracy within ±0.02 Hz in a range from 49 to 51 Hz, system state measuring unit 2b2 samples the frequency fat intervals of 0.2 ms, accumulates the sampled values in cyclic periods of 100 ms to calculate f values, and calculates df/dt based on the difference between chronologically spaced f values.

According to the present exemplary embodiment, system state measuring unit 2b2 multiplies the frequency rate-of-change df/dt by a coefficient X to calculate an adjustment electric power level ΔP. In calculating an adjustment electric power level ΔP, system state measuring unit 2b2 may use a frequency deviation Δf calculated by integrating the frequency rate-of-change over time. Since the adjustment electric power level ΔP is an estimated value, system state measuring unit 2b2 can correct the adjustment electric power level ΔP in view of system configurations (system scale, system constants, etc.) to increase the accuracy of the adjustment electric power level ΔP. However, a description of correction of the adjustment electric power level ΔP will be omitted below.

Selector 2b3 may generally be referred to as selecting means.

Selector 2b3 selects an adjustment battery to be used for adjusting the electric power level of the electric power system from ESs 5lb through 5mb based on the adjustment electric power level ΔP that is calculated by system state measuring unit 2b2 and the delay period Δt of each of ESs 5lb through 5mb that is calculated by ES information collector 2b1.

For example, selector 2b3 preferentially selects those of ESs 5lb through 5mb which have a shorter delay period Δt as an adjustment battery, and increases the number of adjustment batteries in accordance with the increase of the adjustment electric power level ΔP.

Since the adjustment electric power level ΔP is calculated based on the frequency rate-of-change df/dt, selector 2b3 selects adjustment batteries from ESs 5lb through 5mb based on the frequency rate-of-change df/dt and the delay period Δt of each of ESs 5lb through 5mb.

Selector 2b3 includes mapping table generator 2b3a and battery selector 2b3b.

Mapping table generator 2b3a may generally be referred to as grouping means.

Mapping table generator 2b3a divides ESs 5lb through 5mb into a plurality of groups sorted out according to the length of the delay periods Δt.

Figure 4:
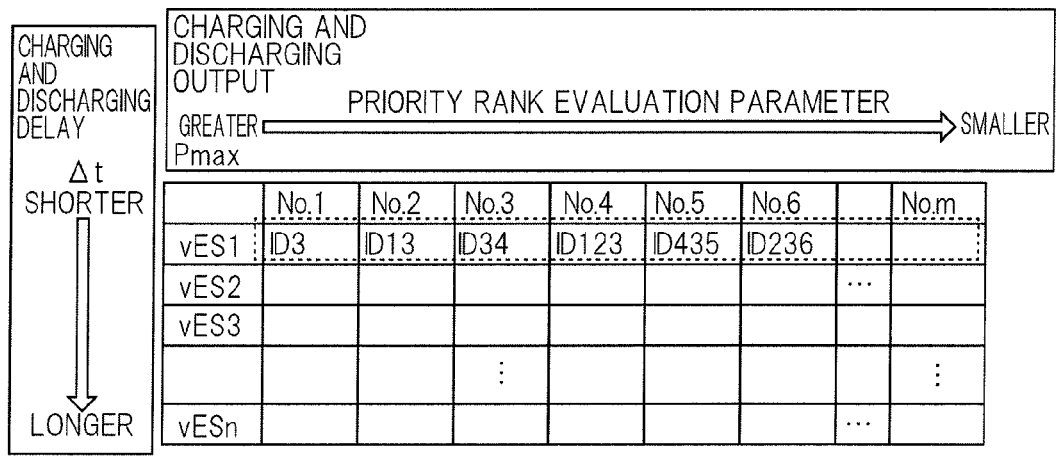

FIG. 4 is a diagram showing a mapping table of the results of a grouping process carried out by mapping table generator 2b3a.

As shown in FIG. 4, groups vES1 through vESn are illustrated as a plurality of groups sorted out according to the length of the delay periods Δt. "n" represents an integer of 2 or greater.

The delay periods Δt for sorting out groups vES1 through vESn represent time zones each 100 msec. long. For example, a delay period Δt which is equal to or longer than 0 msec. but equal to or shorter than 100 msec. is used to indicate group vES1, and a delay period Δt which is longer than 100 msec. but is equal to or shorter than 200 msec. is used to indicate group vES2.

Specifically, ESs whose delay period Δt is equal to or longer than 0 msec. but equal to or shorter than 100 msec. belong to group vES1, and ESs whose delay period Δt is longer than 100 msec. but is equal to or shorter than 200 msec. belong to group vES2.

However, the time zones represented by the delay periods Δt are not limited to 100 msec., but may be changed.

Mapping table generator 2b3a assigns priority ranks which are higher for greater maximum charging and discharging output levels to the ESs belonging to the groups.

The mapping table shown in FIG. 4 also includes priority ranks assigned to the ESs belonging to the groups. Though not shown in FIG. 4, the mapping table also includes the maximum charging and discharging output levels of the ESs.

For example, in group vES1 shown in FIG. 4, the highest priority rank (No. 1) is assigned to the ES that is identified as ID3, and the second highest priority rank (No. 2) is assigned to the ES that is identified as ID13. The number combined with an ID corresponds to the number represented by "m" that denotes an ES.

Battery selector 2b3b may generally be referred to as battery selecting means.

Battery selector 2b3b preferentially selects those of groups vES1 through vESn which have a shorter delay period Δt as adjustment groups, and selects the ESs in the adjustment groups as adjustment batteries. Battery selector b3b also increases the number of adjustment groups as the absolute value of the frequency rate-of-change df/dt is greater.

Command controller 2b4 may generally be referred to as command means.

Command controller 2b4 supplies an execution command (an execution command for charging or discharging an adjustment battery) to an adjustment battery.

For example, if system state measuring unit 2b2 calculates an insufficient electric power level of the electric power system as an adjustment electric power level ΔP, i.e., if the frequency rate-of-change df/dt is of a negative value, then command controller 2b4 supplies each of adjustment batteries with a discharging execution command, as the execution command, indicating a discharging level for each of the adjustment batteries so that the total of the discharging levels of the adjustment batteries will approach or agree with the absolute value of the adjustment electric power level ΔP.

Relay node 4 relays communications between DEMS 2b and communication terminals 5la through 5ma and hence communications between DEMS 2b and ESs 5lb through 5mb. The number of relay nodes 4 is not limited to 1, but signals may be transmitted through a plurality of nodes depending on the state of a communication path from DEMS 2b to the customer's ESs. Although the number of nodes should be as small as possible from the standpoint of minimizing a communication delay, if signals are transmitted through a finite number of nodes, then routes for transmitting the signals and the number of nodes may be changed for minimizing a communication delay.

Communication terminals 5la through 5ma perform communications between respective ESs 5lb through 5mb and DEMS 2b.

Operation will be described below.

Figure 5:
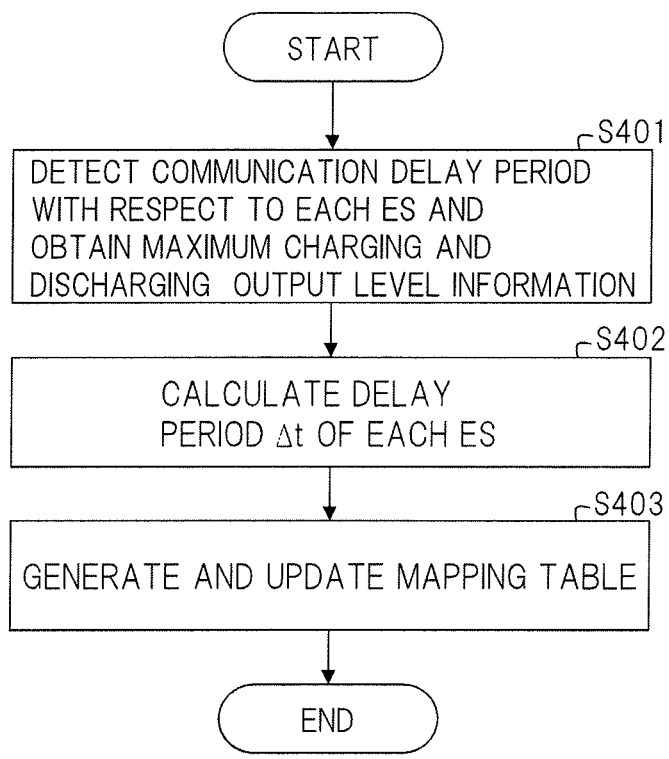
FIG. 5 is a flowchart of an operation sequence for generating the mapping table shown in FIG. 4.

FIG. 5 is a flowchart of an operation sequence for generating the mapping table shown in FIG. 4.

The operation sequence shown in FIG. 5 is executed at certain time intervals of 2 seconds, for example. The time intervals are not limited to 2 seconds, but may be changed. In cases where a delay guarantee is provided by dedicated lines or the like, it is possible to execute the operation sequence at longer time intervals for obtaining delay period data.

It is assumed that ES information collector 2b1 has already obtained response period information of each of ESs 5lb through 5mb and has already stored the processing delay period Δtd in DEMS 2b. It is also assumed that ES information collector 2b1 uses the sum of the processing delay period Δtd in DEMS 2b, the intradevice response period, and the communication delay period as a delay period Δt.

ES information collector 2b1 detects the communication delay period of each of ESs 5lb through 5mb, and obtains maximum charging and discharging output level information of each of ESs 5lb through 5mb from controller 5b2 of each of ESs 5lb through 5mb (step S401). To obtain the maximum charging and discharging output level information, controller 5b2 may be ancillary to the BMU or the PCS. Alternatively, ES information collector 2b1 may obtain the maximum charging and discharging output level information from an EMS server other than the ESs depending on the system configuration.

In step S401, for example, ES information collector 2b1 sends a response request for requesting a response to each of ESs 5lb through 5mb. When the communication terminal of each of ESs 5lb through 5mb receives the response request, controller 5b2 sends a response in reply to the response request to ES information collector 2b1 which is a source for sending the response request. ES information collector 2b1 receives the response in reply to the response request, and detects, as a communication delay period, a period calculated by dividing, by 2, the period that has elapsed after ES information collector 2b1 sends the response request until it receives the response, with respect to each of ESs 5lb through 5mb.

Then, ES information collector 2b1 calculates a delay period Δt by adding the stored processing delay period Δtd in DEMS 2b, the intradevice response period represented by the response period information obtained in advance, and the detected communication delay period with respect to each of ESs 5lb through 5mb (step S402).

Then, ES information collector 2b1 supplies the delay period Δt and the maximum charging and discharging output level information of each of ESs 5lb through 5mb to mapping table generator 2b3a.

In response to the delay period Δt and the maximum charging and discharging output level information of each of ESs 5lb through 5mb, mapping table generator 2b3a generates a mapping table shown in FIG. 4 using the delay period Δt and the maximum charging and discharging output level information of each of ESs 5lb through 5mb, and keeps the generated mapping table.

According to the present exemplary embodiment, mapping table generator 2b3a first classifies each of ESs 5lb through 5mb into either one of groups vES1 through vESn based on the delay period Δt of each of ESs 5lb through 5mb. Then, mapping table generator 2b3a assigns priority ranks which are higher for greater maximum charging and discharging output levels to the ESs belonging to the groups. Thereafter, mapping table generator 2b3a generates a mapping table (see FIG. 4) representing the priority ranks assigned to the groups and the maximum charging and discharging output levels of the respective ESs.

Each time mapping table generator 2b3a generates a mapping table, it deletes the mapping table generated before the present mapping table is generated. Therefore, the existing mapping table is updated (step S403).

Figure 6:
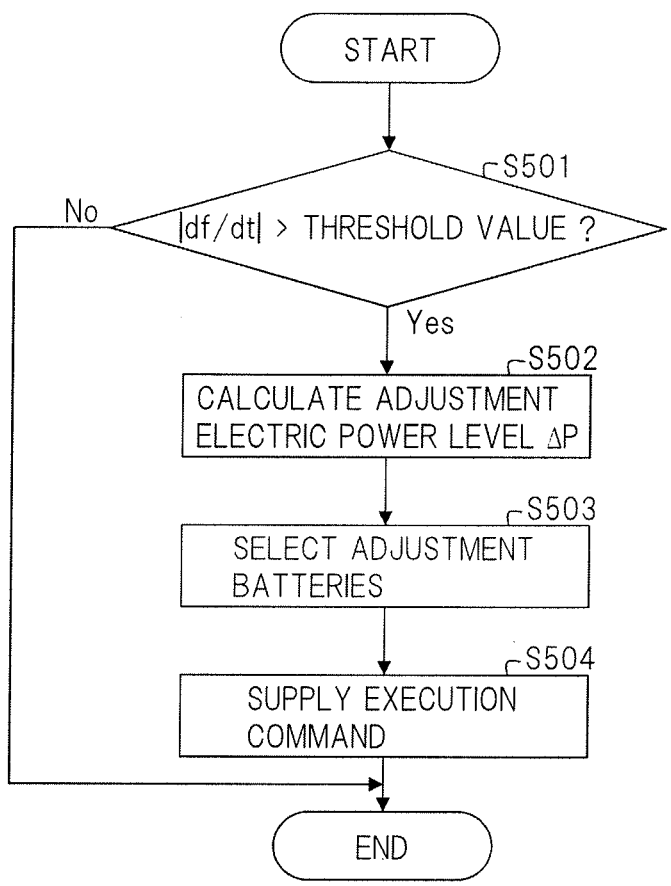
FIG. 6 is a flowchart of an operation sequence for selecting an adjusting battery and supplying an execution command to the adjusting battery.

FIG. 6 is a flowchart of an operation sequence for selecting an adjusting battery and supplying an execution command to the adjusting battery. The operation sequence shown in FIG. 6 is executed continuously.

System state measuring unit 2b2 detects a frequency rate-of-change df/dt of electric power in the electric power system at all times, and judges whether or not the detected absolute value of the frequency rate-of-change df/dt is greater than a threshold value that is used to judge whether or not it is necessary for DEMS 2b to supply an execution command (step S501). A frequency deviation Δf in a certain period may be used as the threshold value.

If the absolute value of the frequency rate-of-change df/dt is greater than the threshold value, then system state measuring unit 2b2 judges that it is necessary for DEMS 2b to supply an execution command, and calculates an adjustment electric power level ΔP based on the frequency rate-of-change df/dt (step S502).

For example, system state measuring unit 2b2 multiplies the frequency rate-of-change df/dt by a coefficient X to calculate an adjustment electric power level ΔP. It is assumed hereinbelow that the coefficient X is a positive constant. Therefore, if the frequency rate-of-change df/dt is a negative value, then the adjustment electric power level ΔP is a negative value, indicating an insufficient electric power level of the electric power system. On the other hand, if the frequency rate-of-change df/dt is a positive value, then the adjustment electric power level ΔP is a positive value, indicating an excessive electric power level of the electric power system.

Then, system state measuring unit 2b2 supplies the adjustment electric power level ΔP to battery selector 2b3b and command controller 2b4.

When battery selector 2b3b receives the adjustment electric power level ΔP, it refers to the mapping table generated by mapping table generator 2b3a and preferentially selects a number of adjustment batteries (=output electric power) required to satisfy the adjustment electric power level ΔP from those of ESs 5lb through 5mb which have shorter delay periods Δt (step S503).

Then, battery selector 2b3b supplies the result of selection of the adjustment batteries to command controller 2b4.

In response to the result of selection of the adjustment batteries, command controller 2b4 supplies an execution command (an execution command for charging or discharging the adjustment batteries) to the adjustment batteries (step S504).

According to the present exemplary embodiment, if the frequency rate-of-change df/dt is a negative value, then command controller 2b4 supplies each of the adjustment batteries with a discharging execution command, as the execution command, indicating a discharging level for each of the adjustment batteries so that the total of the discharging levels of the adjustment batteries will approach or agree with the absolute value of the adjustment electric power level ΔP.

When each of the adjustment batteries receives the discharging execution command through the communication terminal connected thereto, it starts discharging itself as indicated by the discharging execution command, and sends information indicating the start of the discharging process to ES information collector 2b1.

If the frequency rate-of-change df/dt is a positive value, then command controller 2b4 supplies each of the adjustment batteries with a charging execution command, as the execution command, indicating a charging level for each of the adjustment batteries so that the total of the charging levels of the adjustment batteries will approach or agree with the absolute value of the adjustment electric power level ΔP.

When each of the adjustment batteries receives the charging execution command through the communication terminal connected thereto, it starts charging itself as indicated by the charging execution command, and sends information indicating the start of the charging process to ES information collector 2b1.

An example of the present exemplary embodiment will be described below.

It is assumed hereinbelow that a certain electric power station stops generating electric power and the frequency of electric power of the associated electric power system abruptly drops.

Figure 7:
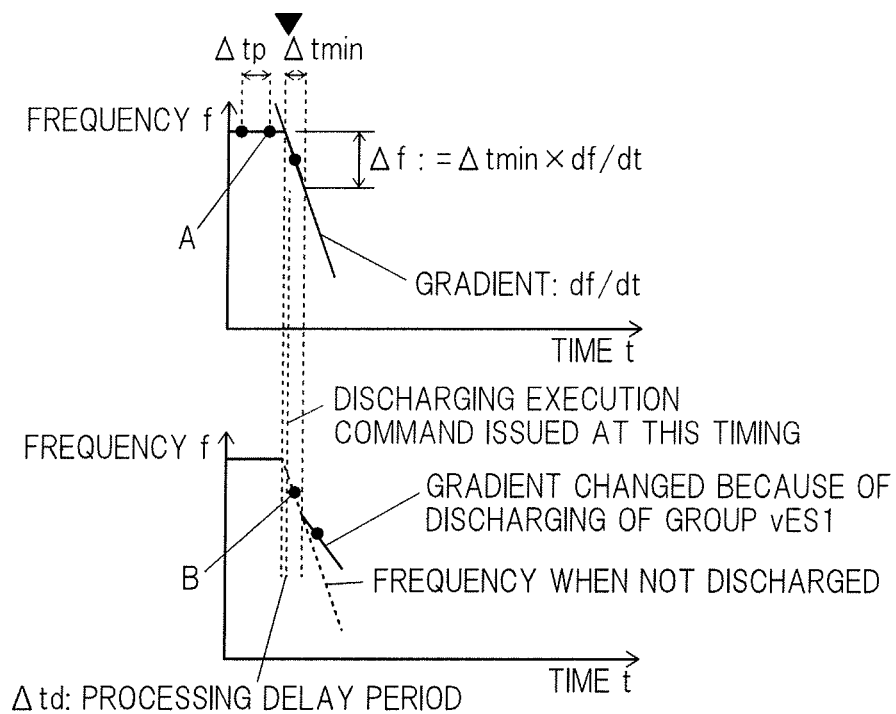
FIG. 7 is a set of diagrams showing how the frequency of electric power of an electric power system changes after the frequency of electric power has suddenly dropped.

FIG. 7 is a diagram showing how the frequency of electric power of an electric power system changes after the frequency of electric power has suddenly dropped.

In FIG. 7, Δtp represents a time interval in which ES information collector 2b1 collects the communication delay period of each of ES 5lb through 5mb or an updating period in which mapping table generator 2b3a updates a mapping table.

If the absolute value of the frequency rate-of-change df/dt becomes greater than the threshold value due to the drop in the frequency of electric power of the electric power system, system state measuring unit 2b2 calculates a frequency deviation Δf as a target by multiplying the frequency rate-of-change df/dt by a longer value of 100 msec. (hereinafter referred to as "Δtmin") of the delay period Δt (ranging from 0 to 100 msec., for example) that defines group vES1 with the shortest delay period Δt among groups vES1 through vESn. The frequency deviation Δf represents a value produced by subtracting the present frequency of electric power from the frequency of electric power upon elapse of a period Δtmin (100 msec.) from the present time.

Then, system state measuring unit 2b2 calculates an adjustment electric power level ΔP by multiplying the frequency deviation Δf by a preset correlation coefficient α, and supplies the adjustment electric power level ΔP to battery selector 2b3b and command controller 2b4.

When battery selector 2b3b receives the adjustment electric power level ΔP, it refers to the mapping table and calculates the total ΣvES1Pmax of maximum charging and discharging output levels of the ESs in group vES1.

Then, battery selector 2b3b judges a magnitude relationship between the absolute value of the adjustment electric power level ΔP and the total ΣvES1Pmax. Cases that occur when |adjustment electric power level ΔP|<=total ΣvES1Pmax and when |adjustment electric power level ΔP|>total ΣvES1Pmax will be described separately below.

Case 1|Adjustment Electric Power Level ΔP|<=Total ΣvES1Pmax:

If |adjustment electric power level ΔP|<=total ΣvES1Pmax, then battery selector 2b3b selects group vES1 as an adjustment group, selects the ESs belonging to group vES1 as adjustment batteries, and supplies the result of selection of the adjustment batteries to command controller 2b4.

When command controller 2b4 receives the result of selection of the adjustment batteries, it refers to the mapping table and calculates a discharging output P for each of the adjustment batteries according to the equation:

$$P = P\max \times (|\Delta P| \Sigma vES1P\max), \text{ for example,}$$

where Pmax represents the maximum charging and discharging output level of the adjustment battery in question.

Command controller 2b4 supplies each of the adjustment batteries with a discharging execution command indicating the discharging output P for the adjustment battery.

Each of the adjustment batteries starts to discharge itself according to the discharging execution command, and sends information indicating the start of the discharging process to ES information collector 2b1.

The adjustment electric power level $\Delta P$ depends on the scale of the electric power system, a system constant (a constant set in the electric power system for the calculation of the adjustment electric power level), and the scale of the accident, and the correlation coefficient $\alpha$ may possibly not necessarily be an optimum value.

Figure 8:
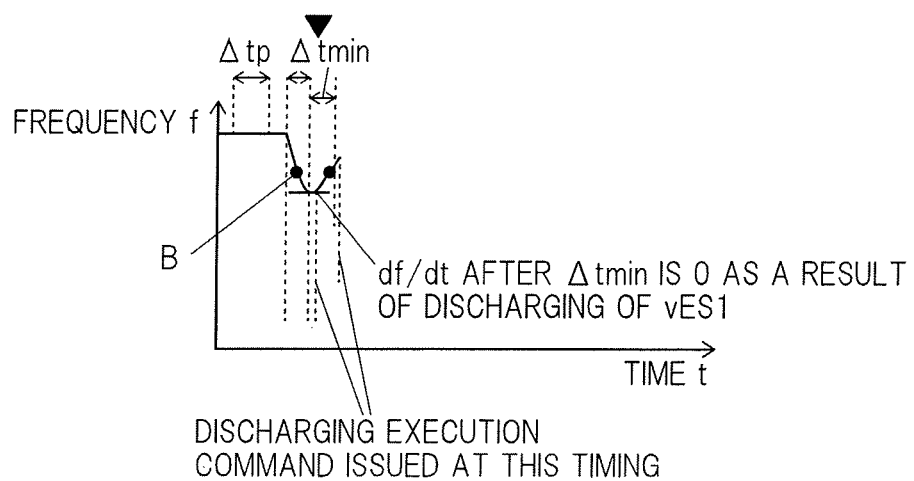
FIG. 8 is a diagram showing by way of example a situation after a correlation coefficient α is generally appropriate and only the ESs belonging to group vES1 are discharged.

FIG. 8 is a diagram showing by way of example a situation after the correlation coefficient $\alpha$ is generally appropriate and only the ESs belonging to group vES1 are discharged. It is assumed that the ESs belonging to group vES1 are discharging electric power while keeping some electric power stored.

Since the correlation coefficient $\alpha$ is generally appropriate, the frequency rate-of-change df/dt measured $\Delta$tmin after system state measuring unit 2b2 has judged that DEMS 2b needs to supply an execution command becomes 0. Depending on the state of the electric power generator of the electric power system, this situation, i.e., the situation wherein the frequency rate-of-change df/dt remains as 0, is considered to continue for a certain period of time while the frequency is being shifted. However, the next step of changing to LFC control will be described below.

Based on the information (LFC signal, etc.) supplied from monitor-controller 1b as indicating the output state of an electric power station which has been activated or whose output has increased to manage the balance of electric power supply and demand in case of emergency, command controller 2b4 lowers the discharging output P of the adjustment batteries by 10% or 5%, for example, in a discharging execution command issued in each period $\Delta$tmin. At this time, a frequency-adjusting electric power generator in another electric power station of the electric power system is operating to shifting the frequency back to its reference value while increasing its output power. The rate at which the discharging output P of the adjustment batteries is lowered is not limited to 10% or 5% in each period $\Delta$tmin., but may be set to an appropriate value depending on output fluctuations of the electric power station.

Case 2) |Adjustment Electric Power Level $\Delta$P|>Total $\Sigma$vES1Pmax:

If |adjustment electric power level $\Delta$P|>total $\Sigma$vES1Pmax, then battery selector 2b3b selects group vES1 as an adjustment group, refers to the mapping table, and calculates a total $\Sigma$vES2Pmax of maximum charging and discharging output levels of the ESs in group vES2.

Battery selector 2b3b judges a magnitude relationship between (adjustment electric power level $\Delta$P|–total $\Sigma$vES1Pmax) and the total $\Sigma$vES2Pmax.

If (|adjustment electric power level $\Delta$P|–total $\Sigma$vES1Pmax)<=total $\Sigma$vES2Pmax, then battery selector 2b3b further selects group vES2 as an adjustment group.

Battery selector 2b3b selects the ESs belonging to group vES2 as adjustment batteries, and supplies the result of selection of the adjustment batteries to command controller 2b4.

When command controller 2b4 receives the result of selection of the adjustment batteries, it refers to the mapping table and supplies a discharging execution command indicating a discharging output P for the ESs belonging to group vES1 as a maximum charging and discharging output level Pmax for the ESs and a discharging execution command indicating a discharging output P for the ESs belonging to group vES2 as a value calculated according to the equation:

$$P=P\max\times((|\Delta P|-\Sigma vES1P\max)/\Sigma vES2P\max), \text{ for example.}$$

If (|adjustment electric power level $\Delta$P|–total $\Sigma$vES1Pmax)>total $\Sigma$vES2Pmax, then battery selector 2b3b preferentially selects a group with a shorter delay period as an adjustment group until the total of maximum charging and discharging output levels of the ESs belonging to the adjustment group becomes equal to or greater than the absolute value of the adjustment electric power level $\Delta$P.

If command controller 2b4 refers to the mapping table and judges that a plurality of adjustment groups are selected, then it supplies a discharging execution command indicating a discharging output P as a value calculated according to the equation:

$$P=P\max\times((|\Delta P|-((\Sigma vES1P\max)+\ldots+\Sigma vES(i-1)P\max)))/\Sigma vESiP\max) \text{ for the ESs}$$

belonging to a group having the longest delay period (longest period group: hereinafter referred to as "group vESi") among the adjustment groups, and supplies a discharging execution command indicating a discharging output P as Pmax for the ESs belonging to the groups other than the longest period group among the adjustment groups.

Figure 9:
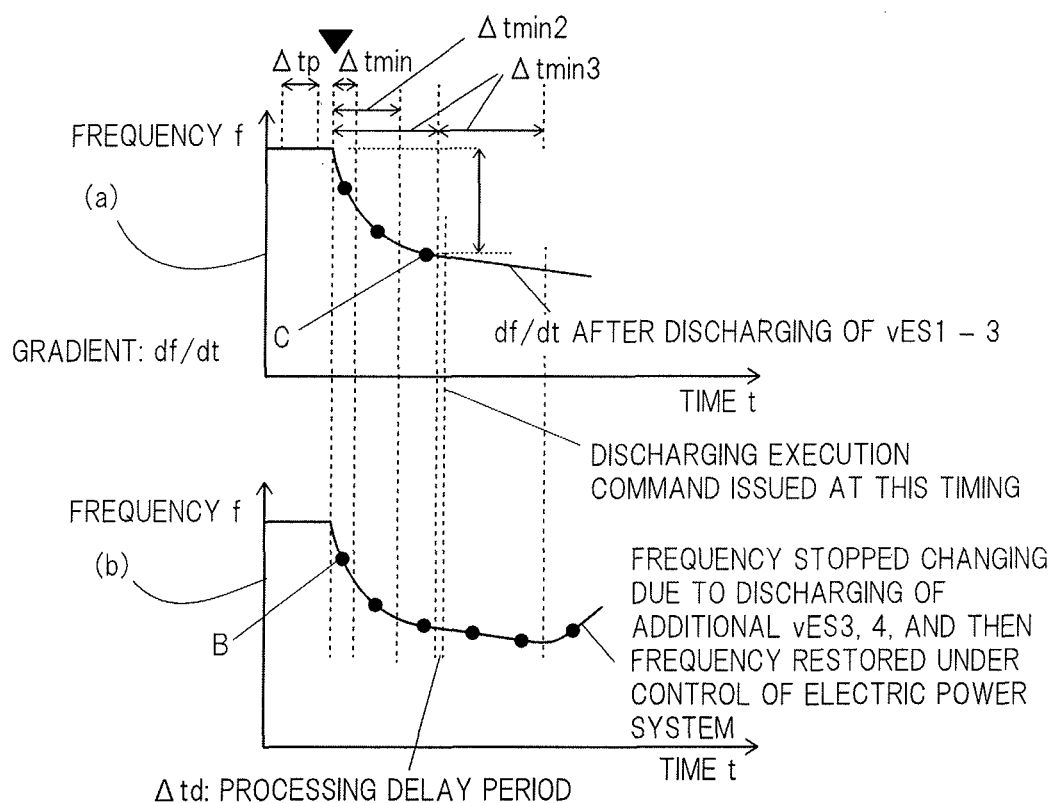
FIG. 9 is a set of diagrams showing by way of example a situation after the correlation coefficient α is not optimum and the ESs belonging to groups vES1 through vES3 are discharged.

FIG. 9 is a set of diagrams showing by way of example a situation after the correlation coefficient $\alpha$ is not optimum and the ESs belonging to groups vES1 through vES3 are discharged. It is assumed that the ESs belonging to group vES1 and the ESs belonging to group vES2 are discharging electric power according to the maximum discharging output, and the ESs belonging to group vES3 are discharging electric power while keeping some electric power stored.

In FIG. 9, $\Delta$tmin2 represents a longer value (200 msec.) of the delay period $\Delta$t that defines group vES2, and $\Delta$tmin3 represents a longer value (300 msec.) of the delay period $\Delta$t that defines group vES3.

As shown in FIG. 9, the frequency rate-of-change df/dt (hereinafter referred to as "df/dt(t3)) measured $\Delta$tmin after system state measuring unit 2b2 has judged that DEMS 2b needs to supply an execution command is not 0, and hence system state measuring unit 2b2 judges that the correlation coefficient $\alpha$ has not been optimum.

If system state measuring unit 2b2 judges that the correlation coefficient $\alpha$ has not been optimum, then it calculates an additional adjustment electric power level $\Delta$Pa by multiplying the frequency rate-of-change df/dt(t3) by the constant X, and supplies the additional adjustment electric power level $\Delta$Pa to the battery selector 2b3b and command controller 2b4.

When battery selector 2b3b receives the additional adjustment electric power level $\Delta$Pa, it select new adjustment batteries by preferentially selecting ESs with a short period $\Delta$t from the ESs to which no discharging execution command has been supplied, while referring to a mapping table generated depending on operation of ES information collector 2b1 at timing C in FIG. 9. Battery selector 2b3b continues to select new adjustment batteries until the total of maximum charging and discharging output levels of the new adjustment batteries exceeds the absolute value of the additional adjustment electric power level $\Delta$Pa. Battery selector 2b3b then supplies the result of selection of the new adjustment batteries to command controller 2b4.

When command controller 2b4 receives the result of selection of the new adjustment batteries, it supplies each of the new adjustment batteries with a discharging execution command indicating the maximum charging and discharging output level Pmax as a discharging output P for the new adjustment batteries.

FIG. 9 includes in a lower section (b) thereof a diagram showing a state wherein the frequency of electric power stops changing and is being recovered by the start of the LFC control over the electric power system. When the LFC control takes over and the frequency goes back to its reference value, command controller $2b4$ lowers the discharging output P of the adjustment batteries or the new adjustment batteries by 10% or 5% in a discharging execution command issued in each period $\Delta$tmin, for example, based on the information (LFC signal, etc.) supplied from monitor-controller $1b$ as indicating the output state of an electric power station that has been activated or as indicating the output state of an electric power station whose output has increased in order to manage the balance of electric power supply and demand in case of emergency. The rate at which the discharging output P is lowered is not limited to 10% or 5% in each period $\Delta$tmin., but may be set to an appropriate value depending on output fluctuations of the electric power station.

Advantages of the present exemplary embodiment will be described below.

According to the present exemplary embodiment, ES information collector $2b1$ detects a delay period $\Delta t$ of each of ESs $5lb$ through $5mb$. System state measuring unit $2b2$ measures a frequency rate-of-change df/dt of electric power in the electric power system. Selector $2b3$ selects adjustment batteries based on the frequency rate-of-change df/dt and the delay period $\Delta t$ of each of ESs $5lb$ through $5mb$. Command controller $2b4$ supplies an execution command to the adjustment batteries.

Therefore, the battery control system according to the present exemplary embodiment is capable of selecting adjustment batteries in view of the delay period $\Delta t$ of each of ESs $5lb$ through $5mb$, and of adjusting the number of adjustment batteries depending on the frequency rate-of-change df/dt. It is thus possible to control the balance of electric power supply and demand using the adjustment batteries.

The above advantages are also effective in a battery control system comprising ES information collector $2b1$, system state measuring unit $2b2$, selector $2b3$, and command controller $2b4$.

Figure 10:
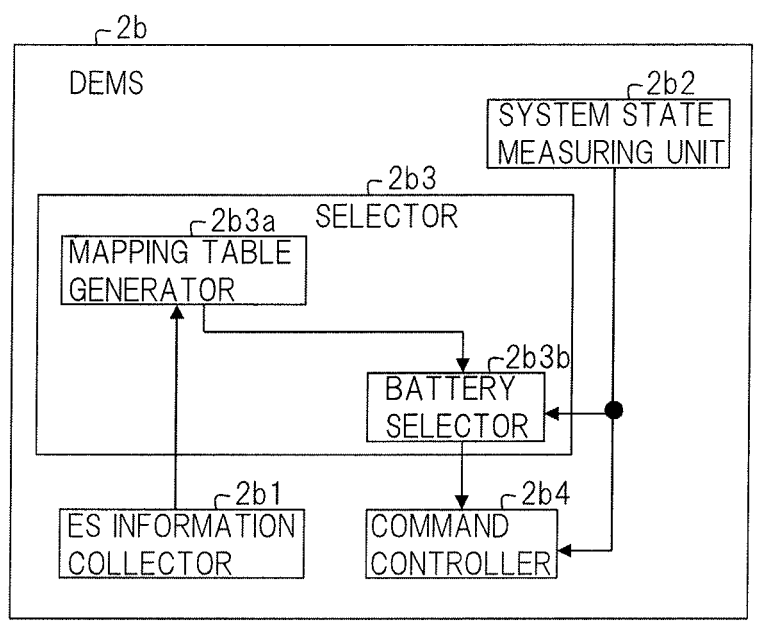
FIG. 10 is a diagram showing a battery control system comprising ES information collector 2b1, system state measuring unit 2b2, selector 2b3, and command controller 2b4.
Figure 11:
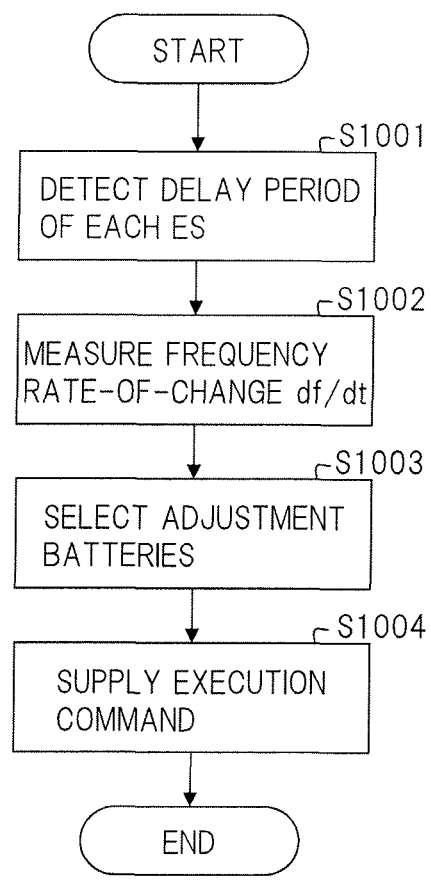
FIG. 11 is a flowchart of an operation sequence of the battery control system shown in FIG. 10.

FIG. 10 is a diagram showing a battery control system comprising ES information collector $2b1$, system state measuring unit $2b2$, selector $2b3$, and command controller $2b4$. FIG. 11 is a flowchart of an operation sequence of the battery control system shown in FIG. 10.

In the battery control system shown in FIG. 10, ES information collector $2b1$ detects a delay period which is a period that has elapsed after DEMS $2b$ supplies an execution command to each of ESs $5lb$ through $5mb$ until the ES starts operating according to the execution command (step S1001).

Then, system state measuring unit $2b2$ measures a frequency rate-of-change df/dt of electric power in the electric power system (step S1002).

Then, battery selector $2b3b$ selects adjustment batteries from ESs $5lb$ through $5mb$ based on the frequency rate-of-change df/dt and the delay period of each of ESs $5lb$ through $5mb$ (step S1003).

Then, command controller $2b4$ supplies an execution command to the adjustment batteries (step S1004).

According to the present exemplary embodiment, selector $2b3$ preferentially selects those of ESs $5lb$ through $5mb$ which have a shorter delay period $\Delta t$ as an adjustment battery, and increases the number of adjustment batteries as the absolute value of the frequency rate-of-change df/dt is greater.

Since those ESs having a shorter delay period $\Delta t$ are preferentially selected as adjustment batteries, those of ESs $5lb$ through $5mb$ which are capable of responding quickly are preferentially selected as adjustment batteries. Furthermore, since the electric power adjustment level is greater in accordance with the absolute value of the frequency rate-of-change df/dt becoming greater, the number of adjustment batteries is increased in accordance with the electric power adjustment level becoming greater. Consequently, it is possible to quickly control the balance between electric power supply and demand appropriately.

According to the present exemplary embodiment, mapping table generator $2b3a$ divides ESs $5lb$ through $5mb$ into a plurality of groups vES1 through vESn sorted out according to the length of the delay periods $\Delta t$. Battery selector $2b3b$ preferentially selects those of groups vES1 through vESn which have a shorter delay period $\Delta t$ as adjustment groups, and selects the ESs in the adjustment groups as adjustment batteries. Battery selector $2b3b$ also increases the number of adjustment groups as the absolute value of the frequency rate-of-change df/dt is greater.

It is thus possible to select adjustment batteries as a group sorted out according to the length of the delay periods $\Delta t$. If each of groups vES1 through vESn is regarded as a virtual battery, then adjustment batteries can be selected as a virtual battery.

According to the present exemplary embodiment, system state measuring unit $2b2$ calculates an adjustment electric power level that needs to be adjusted in the electric power system based on the frequency rate-of-change df/dt. If the frequency rate-of-change df/dt is of a negative value, then command controller $2b4$ supplies each of the adjustment batteries with a discharging execution command, as the execution command, indicating a discharging level for each of the adjustment batteries so that the total of the discharging levels of the adjustment batteries will approach or agree with the absolute value of the adjustment electric power level.

The balance between electric power supply and demand can thus be controlled appropriately when the electric power supplying capability of the electric power system drops.

According to the present exemplary embodiment, if the frequency rate-of-change df/dt is a positive value, then system state measuring unit $2b2$ supplies each of the adjustment batteries with a charging execution command, as the execution command, indicating a charging level for each of the adjustment batteries so that the total of the charging levels of the adjustment batteries will approach or agree with the absolute value of the adjustment electric power level.

The balance between electric power supply and demand can thus be controlled appropriately when the electric power supplying capability of the electric power system becomes excessive.

According to the present exemplary embodiment, ES information collector $2b1$ detects a value about a predetermined item (maximum charging and discharging output level) that is different from the delay period $\Delta t$ from each of ESs $5lb$ through $5mb$. Therefor, it is possible to use, instead of selector $2b3$, a selector for selecting adjustment batteries from ESs $5lb$ through $5mb$ based on the frequency rate-of-change df/dt, the delay period $\Delta t$ of each of ESs $5lb$ through $5mb$, and the value about the predetermined item.

Figure 12:
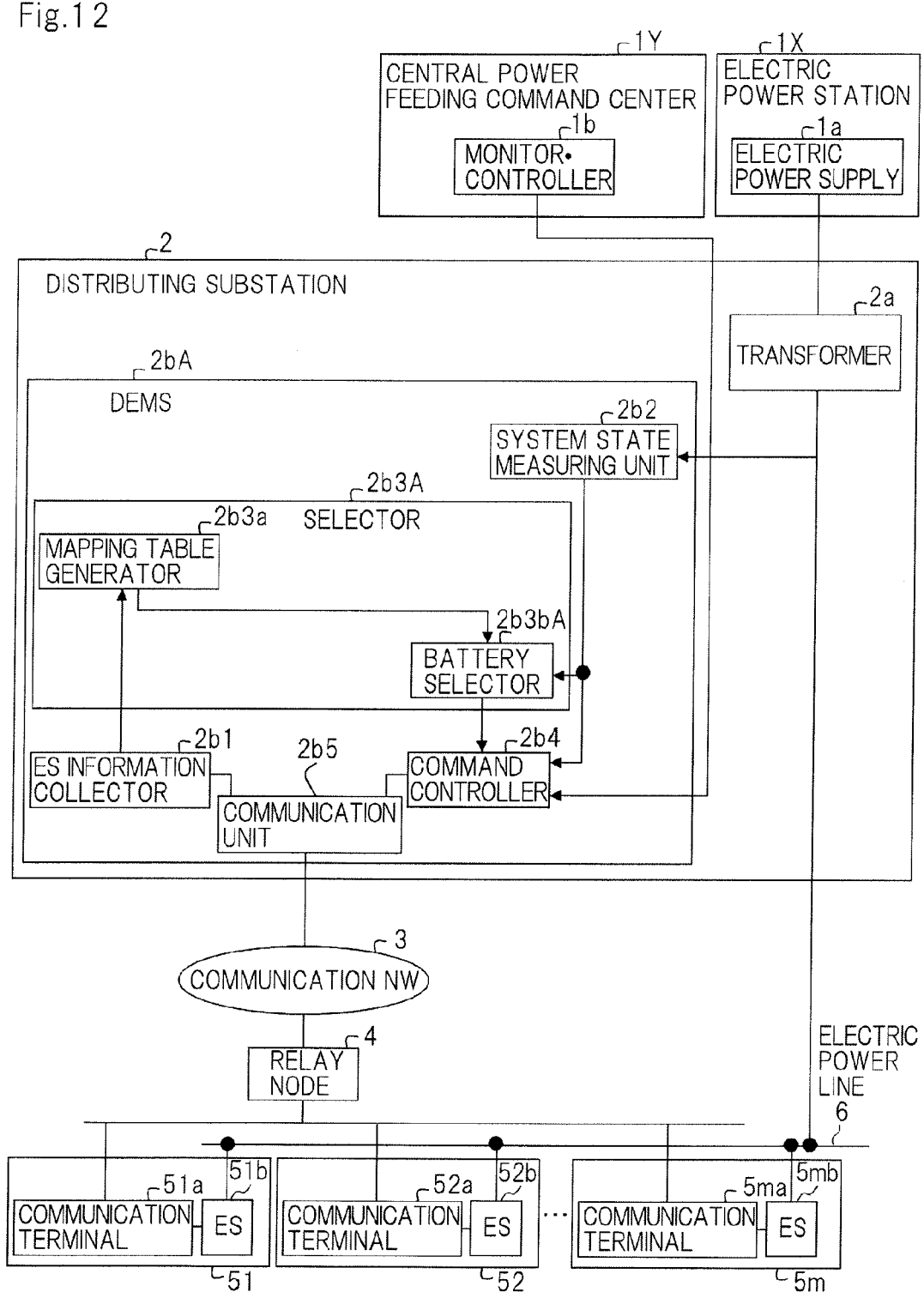
FIG. 12 is a diagram showing DEMS 2bA that includes selector 2b3A instead of selector 2b3.

FIG. 12 is a diagram showing DEMS $2bA$ that includes selector $2b3A$, instead of selector $2b3$, for selecting adjustment batteries from ESs $5lb$ through $5mb$ based on the frequency rate-of-change df/dt, the delay period $\Delta t$ of each of ESs $5lb$ through $5mb$, and the value about the predetermined item. Those parts shown in FIG. 12 which are identical to those shown in FIG. 2 are denoted by identical reference characters.

In FIG. 12, selector 2b3A may generally be referred to as selecting means.

Selector 2b3A includes mapping table generator 2b3a and battery selector 2b3bA.

Battery selector 2b3bA may generally be referred to as battery selecting means.

Battery selector 2b3bA preferentially selects those of groups vES1 through vESn which have a shorter delay period $\Delta t$ as adjustment groups.

Battery selector 2b3bA selects adjustment batteries from the ESs included in the longest period group whose delay period $\Delta t$ is the longest among the adjustment groups, based on the value of the predetermined item. If there are groups present other than the longest period group among the adjustment groups, then battery selector 2b3bA selects the ESs included in the groups other than the longest period group as adjustment batteries.

For example, if there are no groups present other than the longest period group, then battery selector 2b3bA selects those ESs included in the longest period group as adjustment batteries in the descending order of maximum charging and discharging output levels until the total of maximum charging and discharging output levels of the adjustment batteries exceeds the absolute value of the adjustment electric power level $\Delta P$.

If there are groups present other than the longest period group, then battery selector 2b3bA selects those ESs included in the groups other than the longest period group as adjustment batteries, and then selects those of the ESs included in the longest period group as adjustment batteries in the descending order of maximum charging and discharging output levels until the total of maximum charging and discharging output levels of the adjustment batteries exceeds the absolute value of the adjustment electric power level $\Delta P$.

If the adjustment electric power level $\Delta P$ is a negative value, then command controller 2b4 supplies each of the adjustment batteries with a discharging execution command indicating the maximum charging and discharging output level Pmax as a discharging output P for the adjustment batteries.

Therefore, the battery control system is capable of selecting adjustment batteries in view of the value of the predetermined item.

If the maximum charging and discharging output level is used as the predetermined item as described above, it is possible to preferentially select those ESs which have large maximum charging and discharging output levels as adjustment batteries from the longest period group. When the ESs having large maximum charging and discharging output levels are preferentially selected as adjustment batteries, it is possible to reduce the number of adjustment batteries, making it possible to reduce the number of communications with the adjustment batteries.

The predetermined item is not limited to the maximum charging and discharging output level, but may be a remaining charging and discharging level in the ESs, a voltage at junction points between the ESs and the electric power system, or the maximum charging and discharging output level of the ESs and a charging and discharging rate of the ESs. ES information collector 2b1 collects a value about such a predetermined item.

For example, if a remaining charging and discharging level in the ESs is used as the predetermined item, then it is possible to preferentially select those ESs which have a high capability to adjust the electric power level, i.e., those ESs which have a high remaining charging and discharging capacity.

If a voltage at junction points is used as the predetermined item, then for the purpose of charging adjustment batteries, it is possible to preferentially select those ESs which are connected to devices with a high junction point voltage as adjustment batteries, and for the purpose of discharging adjustment batteries, it is possible to preferentially select those ESs which are connected to devices with a low junction point voltage as adjustment batteries. In this case, the battery control system is free from the problem of limited charging and discharging of adjustment batteries due to voltage limitations, e.g., limitations according to electric power system connection guidelines such as 101±6 V and 202±20 V.

If the maximum charging and discharging output level of the ESs and the charging and discharging rate of the ESs are used as predetermined items, then it is possible to preferentially select those ESs which have a large maximum charging and discharging output level and a large charging and discharging rate as adjustment batteries. According to the present exemplary embodiment, a control process about the charging and discharging rate has been omitted for the sake of brevity. For more detailed control, however, it is possible to specify not only the charging and discharging level and periods, but also the charging and discharging rate.

Battery control apparatus 5l through 5m according to the present exemplary embodiment operate as follows: When controller 5b2 receives a response request (inspection information), it sends a response (predetermined information) in reply to the response request to the source of the response request. When controller 5b2 receives an operation command, it controls battery unit 5b1 based on the operation command. Therefore, it is possible to control operation of battery control apparatus 5l through 5m under the control of DEMS 2b or 2bA.

The above exemplary embodiment may be modified as follows:

Controller 5b2 of each ES stores changeability information representing whether or not the adjustment level for the charging and discharging level per unit time of the ES can be changed. The changeability information is set according to the policy of the customer of each ES or the contract between the customer and the electric power supplier, e.g., the electric power company.

When ES information collector 2b1 detects a communication delay period with respect to each of ESs 5lb through 5mb, it obtains changeability information from controller 5b2 of each of ESs 5lb through 5mb.

If the changeability information of an ES selected as an adjustment battery indicates that the adjustment level cannot be changed, then command controller 2b4 does not change the output of the adjustment battery from the maximum charging and discharging output level, but uses it as the maximum charging and discharging output level.

The above exemplary embodiment may also be modified as follows:

Mapping table generator 2b3a may not update the result of grouping of the ESs indicated by the mapping table each time, but may update the result of grouping for five groups with shorter delay periods $\Delta t$ each time and may update the result of grouping for the other groups one out of ten times.

Command controller 2b4 may keep a history of execution commands. It is possible to identify ESs that have been used as adjustment batteries by analyzing the history of execution commands. Using the result that indicates the identified ESs, it is possible to pay those customers who own the ESs that have been used as the adjustment batteries for allowing use of the usage of the adjustment batteries.

According to the present exemplary embodiment, it is effective to increase the number of ESs belonging to group vES1 with the shortest delay period, among the groups listed in the mapping table shown in FIG. 4. It is thus desirable to locate the DEMS at a position where the number of ESs belonging to group vES1 increases. For example, in view of communication delays, it is desirable to install the DEMS at the location of the communication node.

It is possible to increase the number of ESs belonging to group vES1 by increasing the number of DEMSs. In this case, ESs 5$lb$ through 5$mb$ belong to either one of the DEMSs.

However, if there are a plurality of DEMSs, then it is necessary to synchronize the DEMSs and the battery control system has to guarantee a function to measure the frequency rate-of-change.

If there are a plurality of DEMSs, then the DEMSs may be controlled by monitor-controller 1$b$ (see FIG. 2) according to a centralized control process or may operate in an autonomous-decentralized configuration.

If there are a plurality of DEMSs and each of the DEMSs generate a mapping table, then of the adjustment electric power level ΔP, the electric power level ΔPb handled by each of the DEMSs should desirably be determined depending on the ratio of the total of the capacities of the ESs belonging to group vES1 in each of the DEMSs.

For example, the electric power level ΔPb is set to a greater value for those of the DEMSs in which the total capacities of the ESs belonging to group vES1 is greater. However, inasmuch as the total of the capacities of the ESs belonging to group vES1 may possibly change due to fluctuating communication delays caused by an increase or reduction in the communication traffic, the electric power level ΔPb handled by each of the DEMSs changes with time.

In the above exemplary embodiment, relay node 4 may be dispensed with. In the absence of relay node 4, battery control apparatus 5$l$ through 5$m$ are connected to communication NW3.

DEMS 2$b$ or 2$b$A may be implemented by a computer. In this case, the computer reads a program recorded in a recording medium such as a CD-ROM (Compact Disk Read Only Memory) that is readable by the computer, and executes the program to function as ES information collector 2$b$1, system state measuring unit 2$b$2, selector 2$b$3 or 2$b$3A, and command controller 2$b$4. The recording medium is not limited to a CD-ROM, but may be any of other mediums.

Controller 5$b$2 in each of battery control apparatus 5$l$ through 5$m$ may be implemented by a computer. In this case, the computer reads a program recorded in a recording medium that is readable by the computer, and executes the program to function as controller 5$b$2.

Although the present invention has been described with respect to the exemplary embodiment, the present invention is not limited to the above exemplary embodiment. Various changes that can be understood by those skilled in the art may be made to the configurations and details of the present invention within the scope of the present invention.

This application is based upon and claims the benefit of priority from Japanese Patent Application No. 2011-207341 filed on Sep. 22, 2011, the entire disclosure of which is incorporated herein by reference.

DESCRIPTION OF REFERENCE CHARACTERS 1X electric power station
1Y central power feeding command center
1$a$ electric power supply
1$b$ monitor-controller
2 distributing substation
2$a$ transformer
2$b$, 2$b$A DEMS
2$b$1 ES information collector
2$b$2 system state measuring unit
2$b$3, 2$b$3A selector
2$b$3$a$ mapping table generator
2$b$3$b$, 2$b$3$b$A battery selector
2$b$4 command controller
2$b$5 communication unit
3 communication NW
4 relay node
5$l$-5$m$ battery control apparatus
5$la$-5$ma$ communication terminal
5$lb$-5$mb$, 5$b$ ES
5$b$1 battery unit
5$b$2 controller
6 electric power line

What is claimed is:

1. A battery control system for controlling operation of a plurality of batteries connected to an electric power system, comprising:
   a detecting unit that detects a delay period of each battery of the plurality of batteries which represents a period that has elapsed after the battery control system supplies said each battery with an execution command for charging or discharging said each battery until the battery operates according to the execution command;
   a measuring unit that measures a frequency rate-of-change of electric power of said electric power system;
   a selecting unit that selects adjustment batteries for adjusting the electric power of said electric power system from among said plurality of batteries based on said frequency rate-of-change and the delay period of each battery of said plurality of batteries; and
   a command unit for supplying said execution command to said adjustment batteries.

2. The battery control system according to claim 1, wherein said selecting unit preferentially selects batteries, whose delay period is shorter, as said adjustment batteries from said batteries, and increases a number of the adjustment batteries in accordance with absolute value of said frequency rate-of-change becoming greater.

3. The battery control system according to claim 1, wherein said selecting unit comprises:
   a grouping unit that divides said plurality of batteries into a plurality of groups that are sorted out according to a length of each of the delay periods; and
   a battery selecting unit that, from among said groups, preferentially selects groups, whose delay period is shorter, as adjustment groups, and selects the batteries in the adjustment groups as said adjustment batteries;
   wherein said battery selecting unit increases a number of the adjustment groups in accordance with absolute value of said frequency rate-of-change becoming greater.

4. The battery control system according to claim 1, wherein said detecting unit detects a value of a predetermined item that is different from said delay period from among each battery of said plurality of batteries or each device connected respectively to said plurality of batteries; and
   said selecting unit selects said adjustment batteries from among said plurality of batteries based on said frequency rate-of-change, the delay period of each battery of said plurality of batteries, and the value of said predetermined item.

5. The battery control system according to claim 4, wherein said selecting unit comprises:
- a grouping unit that divides said plurality of batteries into a plurality of groups sorted out according to lengths of the delay periods; and
- a battery selecting unit that, from said plurality of groups, preferentially selects groups, whose delay periods are shorter, as adjustment groups, selects said adjustment batteries based on the value of said predetermined item from the batteries included in a longest period group whose delay time is longest among said adjustment groups, and, if there are groups other than said longest period group among said adjustment groups, selects the batteries included in the groups other than said longest period group as said adjustment batteries;
- wherein said battery selecting unit increases a number of the adjustment groups in accordance with absolute value of said frequency rate-of-change becoming greater.

6. The battery control system according to claim 4, wherein said predetermined item comprises a maximum charging and discharging output level of said plurality of batteries, a remaining charging and discharging capacity of said plurality of batteries, a voltage at junction points between said plurality of batteries and said electric power system, or the maximum charging and discharging output level of said batteries and a charging and discharging rate of said plurality of batteries.

7. The battery control system according to claim 1, wherein said measuring unit calculates an adjustment electric power level which needs to be adjusted in said electric power system based on said frequency rate-of-change; and
- if said frequency rate-of-change is a negative value, then said command unit supplies each of said adjustment batteries with a discharging execution command, as said execution command, indicating a discharging level for the adjustment batteries so that the total discharging levels of said adjustment batteries will approach or agree with the absolute value of said adjustment electric power level.

8. The battery control system according to claim 1, wherein said measuring unit calculates an adjustment electric power level which needs to be adjusted in said electric power system based on said frequency rate-of-change; and
- if said frequency rate-of-change is a positive value, then said command unit supplies each of said adjustment batteries with a charging execution command, as said execution command, indicating a charging level for the adjustment batteries so that the total charging levels of said adjustment batteries will approach or agree with the absolute value of said adjustment electric power level.

9. A battery control apparatus for controlling operation of a plurality of batteries connected to an electric power system, comprising:
- a control unit that, in response to inspection information for detecting a communication delay period of a communication path used by said plurality of batteries, sends predetermined information of a source of said inspection information, and, in response to an operation command indicating charging or discharging operation of said plurality of batteries, controls said plurality of batteries based on said operation command.

10. A battery control method to be performed by a battery control system for controlling operation of a plurality of batteries connected to an electric power system, comprising:
- detecting a delay period of each battery of the plurality of batteries which represents a period that has elapsed after the battery control system supplies said each battery with an execution command for charging or discharging said each battery until said each battery operates according to the execution command;
- measuring a frequency rate-of-change of electric power of said electric power system;
- selecting adjustment batteries for adjusting the electric power of said electric power system from among said plurality of batteries based on said frequency rate-of-change and the delay period of each battery of said plurality of batteries; and
- supplying said execution command to said adjustment batteries.

11. A battery control method to be performed by a battery control apparatus for controlling operation of a plurality of batteries connected to an electric power system, comprising:
- in response to inspection information for detecting a communication delay period of a communication path used by said plurality of batteries, sending predetermined information of a source of said inspection information, and, in response to an operation command indicating charging or discharging operation of said plurality of batteries, controlling said plurality of batteries based on said operation command.

12. A non-transitory recording medium readable by a computer and storing a program which enables said computer to perform:
- a detecting procedure for detecting a delay period of each battery of the plurality of batteries which represents a period that has elapsed after the battery control system supplies said each battery with an execution command for charging or discharging said each battery until said each battery operates according to the execution command;
- a measuring procedure for measuring a frequency rate-of-change of electric power of said electric power system;
- a selecting procedure for selecting adjustment batteries for adjusting the electric power of said electric power system from among said plurality of batteries based on said frequency rate-of-change and the delay period of each battery of said plurality of batteries; and
- a command procedure for supplying said execution command to said adjustment batteries.

13. A non-transitory recording medium readable by a computer and storing a program which enables said computer to perform:
- a procedure that, in response to inspection information for detecting a communication delay period of a communication path used by a plurality of batteries, sends predetermined information of a source of said inspection information, and, in response to an operation command indicating charging or discharging operation of a plurality of batteries, controls a plurality of batteries based on said operation command.

* * * * *